(12) United States Patent
Kashima et al.

(10) Patent No.: US 6,298,815 B1
(45) Date of Patent: Oct. 9, 2001

(54) INDUCTION SYSTEM FOR ENGINE OF OUTBOARD MOTOR

(75) Inventors: Yukinori Kashima; Akihiro Onoue; Masanori Takahashi; Yoshibumi Iwata, all of Hamamatsu (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/470,262

(22) Filed: Dec. 22, 1999

(30) Foreign Application Priority Data

Dec. 22, 1999 (JP) .................................................. 10-363985

(51) Int. Cl.⁷ .................................................. F02M 35/10
(52) U.S. Cl. ......................................................... 123/184.21
(58) Field of Search ............................ 123/184.21, 195 P (56) References Cited

U.S. PATENT DOCUMENTS

| | | |
|---|---|---|
| 4,827,879 | 5/1989 | Ohmi et al. . |
| 5,476,402 * | 12/1995 | Nakai et al. ........................ 123/195 P |
| 5,630,390 * | 5/1997 | Tsunoda et al. ................... 123/195 P |
| 5,657,727 | 8/1997 | Uchida . |
| 5,765,519 | 6/1998 | Watanabe . |
| 5,904,604 | 5/1999 | Suzuki et al. . |
| 5,911,211 | 6/1999 | Uchida . |
| 5,941,205 | 8/1999 | Hiraoka et al. . |

* cited by examiner

Primary Examiner—Tony M. Argenbright
Assistant Examiner—Hyder Ali
(74) Attorney, Agent, or Firm—Knobbe, Martens, Olson & Bear, LLP (57) ABSTRACT

An outboard motor includes an internal combustion engine having an induction system formed of a pair of vertically extending plenum chambers which communicate with the combustion chambers formed in the engine via a plurality of intake runners. A common throttle device is located upstream from the plenum chambers and communicates with the plenum chambers via an induction passage having an branch portion. The throttle device is arranged at least partially below an upper surface of the crankcase of the engine. Thus, the overall height of the engine is reduced, thereby reducing the overall height of an outer cowling member provided over the engine.

29 Claims, 6 Drawing Sheets

INDUCTION SYSTEM FOR ENGINE OF OUTBOARD MOTOR

PRIORITY INFORMATION

This application is based on and claims priority to Japanese Patent Application No. 10-363985 filed Dec. 22, 1998.

BACKGROUND OF THE INVENTION

1. Field of the Invention

The present invention is directed to an induction system for an engine and more particularly to an improved induction system for a V-type, four-cycle outboard motor engine.

2. Description of the Related Art

As is known in the art, the configuration of the induction system of an engine is determinative of the performance of the engine. By appropriately configuring the induction system and designing its volume and the length of the intake runners, the performance of the engine can be optimized.

This design parameter, however, is often balanced with space restrictions. That is, the induction system in some applications must be configured to fit within a defined space, sometimes sacrificing the optimal induction system design for top-end engine performance. A prime example of such compromise occurs in outboard motors. In an outboard motor, the engine is contained within a cowling which together form the uppermost portion or "powerhead" of the outboard motor.

During operation of an outboard motor with a watercraft, the powerhead may be exposed above the watercraft, thus affecting the overall aerodynamics of the watercraft. The powerhead typically includes a protective cowling that fits over the engine, in order to protect the engine and enhance the aerodynamics of the outboard motor. The protective cowling is designed to be as close fitting as possible with the engine, thus minimizing the size of and hence the aerodynamic drag caused by the powerhead.

There is an additional problem in conjunction with outboard motors related to separating water, which often is present in the surrounding air about the outboard motor during use, out of the air inducted into the induction system of the engine. For this reason, outboard motor cowling systems employ various types of devices that separate water from the inducted air. These separating systems, however, obviously reduce the air flow, and accordingly, can adversely affect engine performance.

These problems become particularly acute in conjunction with the utilization of four-cycle engines with outboard motors. Four-cycle engines are desirable for use in outboard motors because they improve emission control and better performance throughout a wider range of engine speed. However, because each cylinder in a four-cycle engine fires only once for every two revolutions of the crankshaft, the specific output of a four-cycle engine is lower than a two-cycle engine. Thus, it is desirable that high performance alternatives are used to ensure that four-cycle engines remain competitive with two-cycle engines in outboard motor construction.

Induction systems have been known to include two vertically extending plenum chambers positioned within the valley of a V-type outboard motor engine. The plenum chambers of such known induction systems are connected to the combustion chambers of the engine via a plurality of intake runners. The plenum chambers are also connected to a common intake. A throttle body is disposed downstream from the inlet to control the flow of air into the plenum chambers. In this known induction system, the inlet and the throttle body are arranged above the crankcase of the engine and facing the crankshaft. An example of such induction system is disclosed in U.S. Pat. No. 5,765,519.

SUMMARY OF THE INVENTION

A need therefore exists for a tuned induction system for a four-cycle, V-type outboard motor engine which is compact in shape and effectively utilizes the available space within the cowling of the outboard motor powerhead.

According to one aspect of the invention, an outboard motor includes a four-cycle, V-type internal combustion engine arranged such that its crankshaft is oriented vertically. The engine includes an induction system having a pair of vertically extending plenum chambers which are positioned within the valley between the cylinder banks of the engine and which communicate with the combustion chambers of a respective cylinder bank via a plurality of intake runners. The induction system also includes an induction passage extending from an air inlet to the plenum chambers. A throttle device is provided in the induction system downstream of the inlet, so as to control a flow of air into the plenum chambers. Downstream from the throttle device, a branch portion is provided for connecting the induction passage to each of the plenum chambers. The throttle device is positioned at least partially below the upper surface of the crankcase of the engine By arranging the throttle device at least partially below the upper surface of the crankcase of the engine, the present invention allows for a more compact arrangement of a dual plenum chamber induction system for an engine of an outboard motor engines.

An aspect of the present invention includes a realization that when the throttle device of an induction system is arranged above the crankcase, the overall height of the engine is unnecessarily large. The height of the engine is reduced with the present construction and thus the cowling can be shorter to reduce the portion of the outboard motor exposed above the associated watercraft. There are several positions where the throttle device can be positioned within the cowling of an outboard motor to allow a shorter cowling to be used.

The air inlet preferably includes a silencing device positioned below the upper end of the engine. By arranging the silencing device with the air inlet below the upper end of the engine, the present aspect of the invention allows the inclusion of an additional bulky device without raising the overall height of the engine. Additionally, because there is typically dead space (i.e., unused space) within the cowling of an outboard motor having a V-type engine, the present induction system arrangement allows for additional quieting and improved performance of the engine without increasing the overall size of the cowling used to cover the engine.

Further aspects, features, and advantages of the present invention will become apparent from the Detailed Description of the Preferred Embodiment which follows.

BRIEF DESCRIPTION OF THE DRAWINGS

The above mentioned and other features of the invention will now be described with reference to the drawings of a preferred embodiment of the present invention. The illustrated embodiment of the induction system, which is employed in an engine of an outboard motor, is intended to illustrate, but not to limit, the invention. The drawings contain the following figures.

DETAILED DESCRIPTION OF THE PREFERRED EMBODIMENT

An improved internal combustion engine layout for an outboard motor is disclosed herein. The engine includes an improved layout of the components of an induction system of a four-stroke V-type engine, which provides a compact overall height of the engine. Thus, the overall dimensions of a cowling covering the engine may be reduced which would thereby improve the aerodynamics of the outboard motor. Although the present induction system construction is illustrated and described in the context of an outboard motor, certain aspects of the present invention can be used with engines of other types of vehicles, as well as with other types of prime movers.

Figure 1:
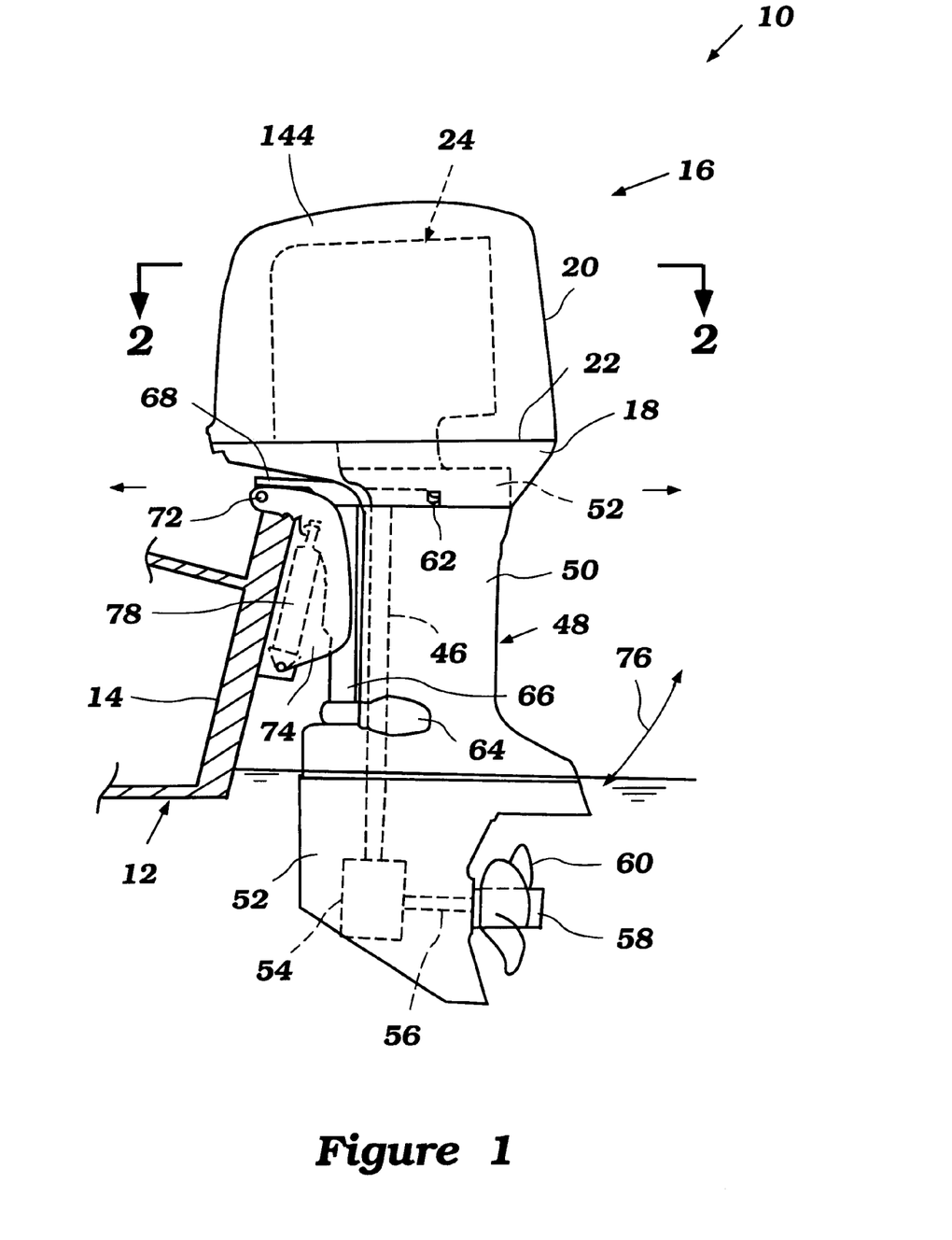
FIG. 1 is a side elevational view of an outboard motor which can embody an engine (shown in phantom) that is configured in accordance with an aspect of the present invention, the outboard motor being mounted to the transom of a watercraft (shown partially)

With reference to FIG. 1, an outboard motor constructed in accordance with the present invention is identified generally by reference numeral 10. The outboard motor 10 is shown as being attached to an associated watercraft hull, indicated generally by the reference numeral 12 and shown partially in cross-section. The outboard motor 10 is shown attached to a transom 14 of the hull 12 in a manner which will be described.

The outboard motor 10 is comprised of a powerhead, indicated generally by the reference numeral 16. The powerhead 16 includes a lower tray portion 18 which may be formed from aluminum or an aluminum alloy, and a main cowling portion 20 that is detachably connected to the tray 18 in a known manner. The main cowling portion 20 is formed from a suitable material, such as a molded fiberglass reinforced resin or the like. The main cowling portion 20 has a lower peripheral edge 22 that is held in a sealing engagement with the tray portion 18 by a suitable latching device (not shown).

The protective cowling 20 encircles an internal combustion engine, indicated generally by the reference numeral 24, and which has a construction that will be described later in more detail. In the illustrated embodiment, however, the engine 24 is a V6, four-stroke engine. Those skilled in the art, however, will readily appreciate that the present induction system can be used with any of a variety of engines having other numbers of cylinders.

Figure 2:
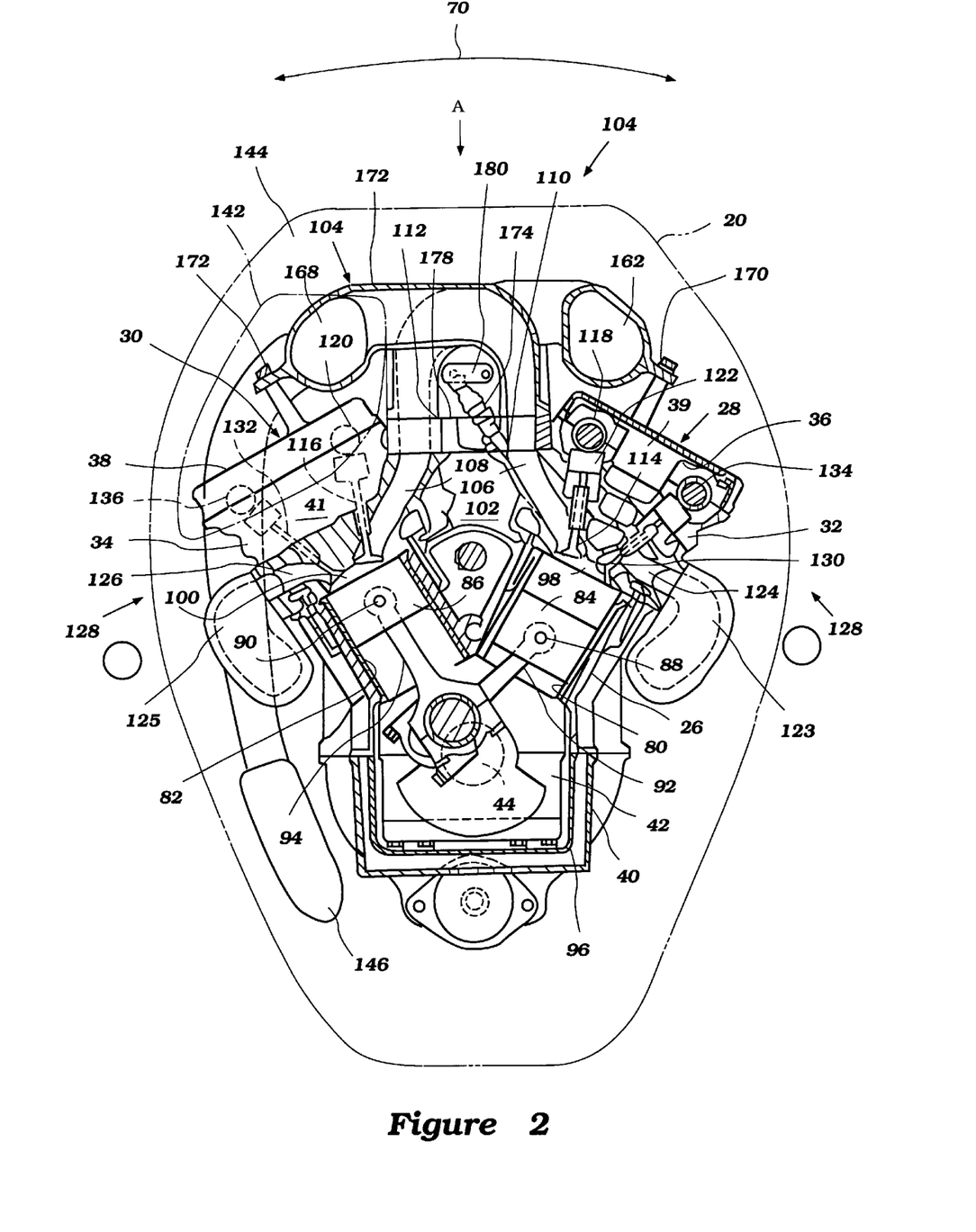
FIG. 2 is a top plan and partial cross-sectional view along line 2—2 in FIG. 1, with an upper cowling of the outboard motor shown in phantom.

As shown in FIG. 2, the engine 24 includes cylinder block 26 which includes a pair of cylinder banks 28 and 30 arranged in a V-type configuration. The cylinder banks 28, 30 are closed at their rear ends (i.e., the end farthest from the transom 14 of the boat) by cylinder head assemblies 32, 34 in a manner which will be described. Cam covers 36, 38 are affixed to the cylinder head assemblies 32, 34, respectively, and enclose respective cam chambers 39, 41 in which the valve actuating mechanisms are contained. In the illustrated embodiment, these valve actuating mechanisms are comprised of twin overhead camshafts for each cylinder head assembly, as described in greater detail below.

A crankcase member 40 is affixed to the end of the cylinder block 26 opposite the cylinder heads 36, 38. As such, the crankcase member 40 defines a crankcase 42 having an upper surface 43 (FIG. 4), and in which a crankshaft 44 is rotatably journaled. As is typical with outboard motor practice, the engine 24 is mounted in a powerhead 16 so that the crankshaft 44 rotates about a generally vertically extending axis. This facilitates coupling to a driveshaft 46 (FIG. 1).

As shown in FIG. 1, the driveshaft 46 extends into and is journaled within a driveshaft housing, indicated generally by the reference numeral 48, and which is enclosed in its upper end by the tray 18. This driveshaft housing 48 includes an outer housing casing 50. An exhaust guide plate assembly 52 is interposed, in a manner to be described, between the engine 24 and the upper end of the driveshaft housing 48 within the tray 18.

The driveshaft 46 extends into a lower unit 52, wherein it drives a conventional bevel gear, forward, neutral and reverse transmission, indicated generally by the reference numeral 54 and shown only schematically. The transmission 54 is shown in a schematic fashion because its construction per se forms no part of the invention. Therefore, any known type of transmission may be employed.

The transmission 54 drives a propeller shaft 56 which is journaled within the lower unit 52 in a known manner. A hub 58 of a propeller 60 is coupled to the propeller shaft 56 for providing a propulsive force to the watercraft hull 12 in a manner well known in the art.

A steering shaft (not shown) is attached to the outer housing casing 50 by an upper bracket assembly 62 and a lower bracket assembly 64 in a known manner. The steering shaft is supported for steering movement within a swivel bracket 66 so as to pivot about a vertical steering axis. The steering axis is juxtaposed to and slightly forward of the driveshaft axis 46. A tiller or steering arm 68 is affixed to the upper end of the steering shaft for steering the outboard motor 10 through an arc 70, as indicated in FIG. 2. The swivel bracket 66 is connected by a pivot pin 72 to a clamping bracket, indicated generally by the reference numeral 74. The pivot pin 72 permits tilt and trim movement of the swivel bracket 66 and outboard motor 10 relative to the transom 14 of the hull 12. This tilt and trim movement is indicated by the arc 76 (FIG. 1).

A hydraulic tilt and trim mechanism 78 may be pivotally connected between the swivel bracket 66 and the clamping bracket 74 for effecting the hydraulic tilt and trim movement, and for permitting the outboard motor 10 to pop up when an underwater obstacle is struck. As is well known, these types of hydraulic mechanisms 78 permit the outboard motor 10 to return to its previous trim adjusted position once such an underwater obstacle is cleared.

With reference to FIG. 2, the construction of the engine 24 will now be described in more detail. As has been noted, the engine 24 is of the V-type and, accordingly, the cylinder block 26 is formed with a pair of angularly related cylinder banks 28, 30, each of which is formed with a plurality of horizontally-extending cylinder bores 80, 82. The cylinder bores 80, 82 may be formed from thin liners that are either cast or otherwise secured in place within the cylinder banks 28, 30. Alternatively, the cylinder bores 80, 82 may be formed directly in the base material of the cylinder banks 28, 30. If a light alloy casting is employed for the cylinder banks 28, 30, such liners can be used.

Figure 4:
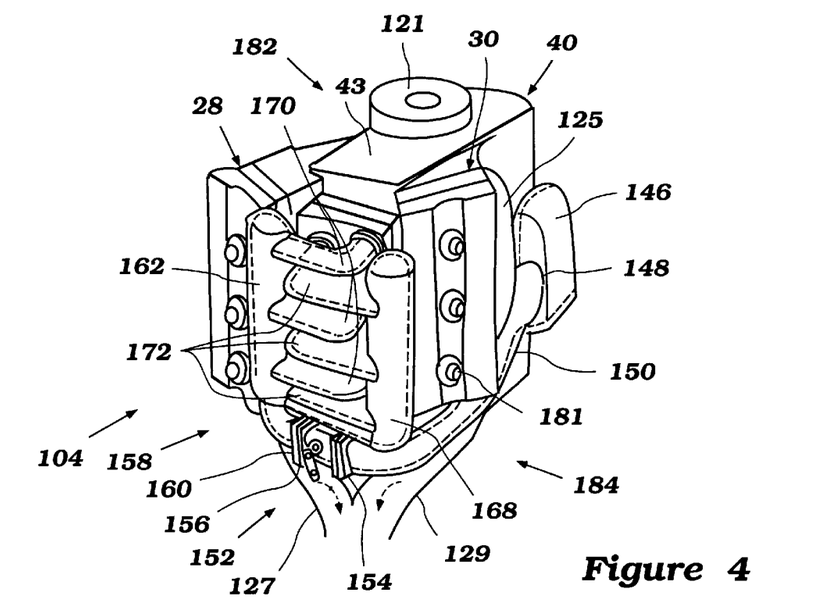
FIG. 4 is a rear, top, and right side perspective view of the engine shown in FIG. 3.

In the illustrated embodiment, the cylinder banks 28, 30 each include three cylinder bores 80, 82. Since the engine 24 is a V-type engine, the cylinder bores 80, 82 in each cylinder bank preferably are staggered with respect to one another. Thus, as shown in FIG. 4, the uppermost cylinder bore in the left cylinder bank 30 (left as shown in FIG. 2) is at an elevation higher than the uppermost cylinder bore in the right cylinder bank 28 (right as shown in FIG. 2).

With reference to FIG. 2, pistons 84, 86 are supported for reciprocation in the cylinder bores 80, 82, respectively. Piston pins 88, 90 connect the pistons 84, 86 to respective connecting rods 92, 94. The connecting rods 92, 94, as is typical in V-type practice, may be journaled in side-by-side relationship on adjacent throws of the crankshaft 44. That is, pairs of cylinders, 80, 82, one from each cylinder bank 28, 30, may have the big ends of their connecting rods 92, 94 journaled in side-by-side relationship on adjacent crankshaft throws. This is one reason why the cylinder bores 80, 82 of the cylinder banks 28, 30 are staggered relative to each other. In the illustrated embodiment, however, separate throws are provided for the cylinders of each cylinder bank 28, 30. The throw pairs are nevertheless disposed between main bearings (not shown) of the crankshaft 44 to maintain a compact construction.

The cylinder head assemblies 32, 34 are provided with individual recesses 98, 100 which cooperate with the respective cylinder bores 80, 82 and heads of the pistons 84, 86 to form the combustion chambers. These recesses 98, 100 are surrounded by a lower cylinder head surface that is planar and held in sealing engagement with either the cylinder banks 28, 30 or with the cylinder head gaskets (not shown) interposed therebetween, in a known manner. These planar surfaces of the cylinder head assemblies 32, 34 may partially override the cylinder bores, 80, 82 to provide a squish area, if desired. The cylinder head assemblies 32, 34 are affixed in any suitable manner to the cylinder banks 28, 30.

Because of the angular inclination between the cylinder banks 28 and 30, as is typical with V-type engine practice, a valley 102 is formed between the cylinder head assemblies 32 and 34. An induction system for the engine, indicated generally by the reference numeral 104 is positioned in part, in the valley 102. The induction system 104 includes intake passages 106, 108 which extend from a surface 110, 112 of the respective cylinder head assemblies 32 and 34, to valve seats formed on the combustion chamber recesses 98, 100. A single intake passage and port may be formed for each combustion chamber recess 98, 100 or, alternatively, there may be multiple valve seats for each recesses 98, 100.

Poppet-type intake valves 114, 116 are slidably supported in the cylinder head assemblies 32, 34 in a known manner, and have their head portions engageable with the valve seats so as to control the flow of the intake charge into the combustion chambers through the intake passages 106, 108. The intake valves 114, 116 are biased toward their closed position by coil compression springs (not shown). The valves 114, 116 are operated by intake camshafts 118, 120, respectively, which are journaled in the cylinder head assemblies 32, 34. The intake camshafts 118, 120 have cam lobes which operate the valves 114, 116 through thimble tappets 122.

The intake camshafts 118, 120 are driven by the crankshaft 44 via a camshaft drive mechanism, which is not shown. However, U.S. Pat. No. 5,765,509 issued to Watanabe, the entire contents of which is hereby expressly incorporated by reference, discloses an embodiment of a drive mechanism for use with the engine 24. Thus, a further description of the camshaft drive mechanism is not necessary for one of ordinary skill in the art to practice the invention.

A flywheel-magneto assembly 121 is disposed at the upper end of and connected to the crankshaft, as seen best understood from FIG. 4. A flywheel-magneto cover desirably covers the flywheel-magneto assembly 121.

On the outer side of the respective cylinder bank 26, 28, each cylinder head assembly 32, 34 is connected with one or more exhaust passages 124, 126. The exhaust passages 124, 126 emanate from one or more valve seats formed in the cylinder head recesses 98, 100, and cooperate with exhaust systems, indicated generally by the reference numeral 128, for discharging exhaust gasses to the atmosphere through a path that will be described later.

As shown in FIG. 2, exhaust valves 130, 132 are supported for reciprocation in the cylinder head assemblies 32, 34, respectively, in a manner similar to the intake valves 114, 116. The exhaust valves 130, 132 are biased toward their closed positions by coil compression springs (not shown). The exhaust valves 130, 132 are opened by overhead mounted exhaust camshafts 134, 136 respectively, which are journaled for rotation in the cylinder head assemblies 32, 34 respectively. The rotational axes of the intake camshafts 118, 120 and the exhaust camshafts 134, 136 are parallel to each other. The exhaust camshafts 134, 136 have cam lobes that cooperate with thimble tappets for operating the exhaust valves 130, 132 in a known manner. Like the intake camshafts 118, 120, the exhaust camshafts 134, 136 may be driven by the crankshaft 44 as disclosed in U.S. Pat. No. 5,765,519, as discussed above.

With reference to FIGS. 1 and 2, the engine 24 discharges exhaust gases through the exhaust manifolds 123 and 125, and down into a silencing arrangement provided with an internal expansion chamber in the driveshaft housing 48 through exhaust pipes 127, 129. The exhaust pipes 127, 129 extend from the exhaust manifolds 123 and 125, respectively. The exhaust pipes 127, 129 extend into an expansion chamber formed at the rear of the driveshaft housing (not shown). The expansion chamber terminates at its lower end in an exhaust gas discharge formed in the lower unit 52 for delivering the exhaust gases to the atmosphere, through the body of water in which the associated watercraft is operating. Although the preferred embodiment illustrates an exhaust passage through the hub, any type of conventional above-the-water exhaust gas discharge may be used with the present invention. For example, the exhaust discharge may include an underwater, high speed exhaust gas discharge and an above the water, low speed exhaust gas discharge.

The induction system 104 for the engine 24 is discussed with reference to FIGS. 2–4. As is typical with outboard motor practice, the powerhead 16, and specifically the main cowling portion 20, is formed with at least one air inlet opening 142, as shown in FIG. 2. The air inlet opening 142 desirably is configured so as to permit copious amounts of air to flow into the interior of the protective cowling while at the same time precluding or substantially precluding water entry. Any of the known inlet type devices can be utilized for this purpose, and therefore, the cowling air inlet opening 142 is shown only schematically.

In conjunction with the induction system 104 for the engine 24, it is desirable to provide a relatively large plenum area that supplies the individual cylinders through respective runners. The use of a plenum area is desired so as to minimize the interference from one cylinder to the others. This presents a particular space problem, particularly in conjunction with outboard motors where space is at a premium. Therefore, the induction system 104 is designed so as to provide a large plenum volume and still maintain a compact construction. Furthermore, construction is such that servicing of the engine is not significantly affected.

Figure 3:
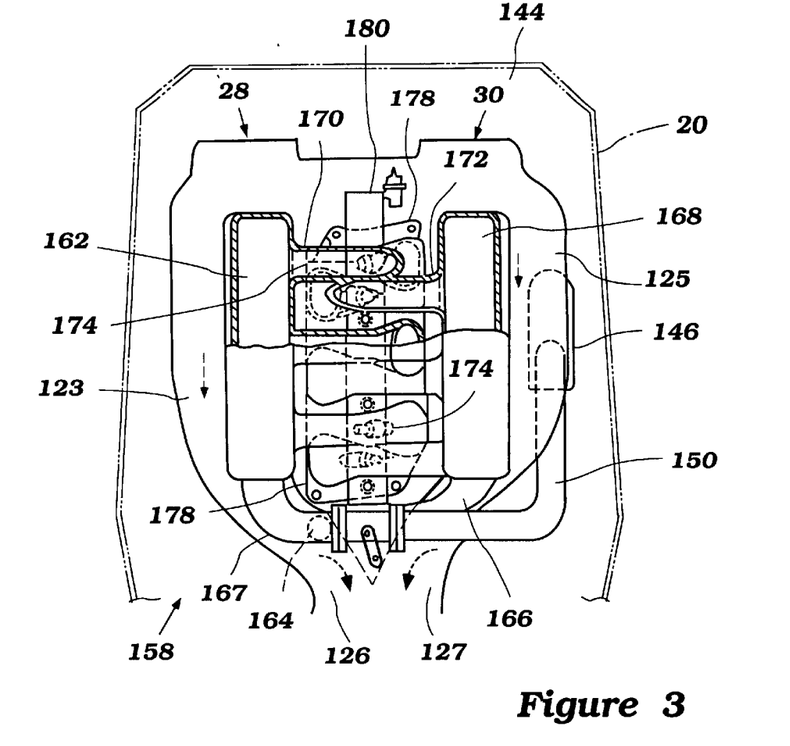
FIG. 3 is a rear elevational view of the engine, as viewed along arrow A shown in FIG. 2, with a partial sectional view of plenum chambers and intake runners included on the engine, and with the upper cowling shown in phantom.

As shown in FIGS. 2 and 3, the cowling member 20 forms an engine compartment 144 around the engine 24. As shown in FIGS. 2–4, the induction system includes an air inlet device 146, positioned adjacent the crankcase chamber 42 of the engine 24. The inlet device 146 includes at least one orifice (not shown in FIG. 4) configured to allow air from the engine compartment 144 to enter the inlet device 146. The inlet device 146 also includes an outlet 148 connected to an induction passage 150.

The induction passage 150 extends between the inlet device and a throttle device 152. The induction passage 150 is connected to the throttle device by a flange assembly 154. The flange assembly 154 is formed of a plurality of plates and fasteners that are configured to form a substantially air tight fluidic connection between the air induction passage 150 and the throttle device 152.

The throttle device 152 in the illustrated embodiment includes a throttle housing 156 and a throttle valve (not shown) journaled within the throttle body 156. Of course, other types of throttle devices also can be used. The throttle valve is operated by a remote actuator. By utilizing a single throttle device 152 for the induction system, the overall construction of the induction system 104 can be significantly simplified.

As shown in FIG. 4, the throttle device 152 is positioned below the intake runners 170, 172 and above the exhaust pipes 127, 129. In the illustrated embodiment, the throttle body 156 is disposed above the point at which the exhaust pipes 127, 129 merge together. The throttle body 156 is attached to a branch portion 158 of the induction passage 150 via a flange assembly 160 which may be constructed identically to flange assembly 154. The branch portion 158 includes a junction portion 164 (best seen in FIG. 3) downstream from the flange 160.

As shown in FIG. 3, the junction portion 164 divides the induction passage 150 into a first branch passage 167 and a second branch passage 166. The first branch passage 167 extends from the junction portion 164 to the second plenum chamber 168. The second branch passage 166 extends forwardly from the junction portion 164 and along a forward side of the throttle device, then curves upwardly to the first plenum chamber 162. As such, the branch portion 158 divides the air flow emanating from the throttle device 152 so as to feed the plenum chambers 162, 168 with substantially equal flows of air.

With reference to FIG. 2, the plenum chambers 162, 168 overlie at least a portion of the cam covers 36, 38 and are mounted thereon by mounting posts 170, 172 which have threaded fasteners, so as to provide a rigid assembly. As shown in FIG. 4, the plenum chambers 162, 168 extend substantially the full length of the respective cylinder banks 28, 30, and thus provide a substantial volume for the inducted air.

With reference to FIGS. 3 and 4, each plenum chamber 62, 68 communicates with a plurality of runners 170, 172, respectively. The runners 170, 172 extend transversely across the upper portion of the engine valley area 102 and curve downwardly so as to communicate with the respective intake passages 106, 108 formed in the head assemblies 32, 34. The runners 170, 172 are in direct alignment with the passages 106, 108 formed in the head assemblies 32 and 34. The runners 170, 172 thus communicate with respective intake passages 106, 108 formed in the cylinder head assembly 32, 34 that is disposed on an opposite side of the valley from the respective plenum chambers 62, 68.

Thus, this arrangement provides not only a large effective plenum chamber volume, since each plenum chamber 162, 168 serves only three cylinders, but also provides relatively long runners 170, 172 that extend from the plenum chambers 162, 168, to the cylinder head induction passages 106, 108. The length of these runners 170, 172 can be tuned relative to the volume so as to provide the desired charging effect in the induction system 104. The described arrangement with the long runners 170, 172 is particularly effective at midrange speeds.

In the illustrated embodiment, the engine 24 is provided with a manifold type fuel injection system. The fuel injection system includes the plurality of fuel injectors 174, one fuel injector 174 for each cylinder head induction passage 106, 108. The fuel injectors 174 are disposed in the area between the reentrant positions of the runners 170, 172 and hence, are protected by these runners, since they are partially surrounded by them, while at the same time being accessible. Thus, air may flow over the injectors 174 so as to cool the injectors 174 along with the air flowing through the runners 106, 108. Preferably, the injectors 174 are of the electrically operated type embodying solenoid actuated valves.

The injectors 174 for the respective cylinder banks 28, 30 are mounted in a manifold flange 178 which is contiguous with the flow passages 106, 108. Hence, the fuel spray from the injectors 174 can easily mix with the air flowing into the combustion chambers 98, 100 so as to provide a good mixture distribution.

The injectors 174 have their tip inlet portions received in a fuel rail 180 that extends vertically through the area encompassed by the runners 170, 172 and is thus protected by the runners 170, 172. The fuel rail 180 has two flow passages, one for the fuel injectors 174 of the cylinder bank 28, and one for the fuel injectors 174 of the cylinder bank 30. As such, the flow passages within the fuel rail 180 are in side-by-side relationship and accommodate the crossover relationship of the injectors 174, as illustrated in FIG. 3.

A suitable fuel supply system is provided for supplying fuel to the fuel rail 180. Such fuel systems are well known in the art and they can be considered to be conventional. Thus, a further description of the fuel delivery system is not necessary for one of ordinary skill in the art to practice the invention.

With reference to FIG. 3, sparkplugs 181 are mounted in the cylinder head assemblies 32, 34. Although not illustrated in the figures, the spark plugs 181 are mounted with their electrodes (i.e., gaps) extending into the recesses 98, 100

(FIG. 1). The sparkplugs 181 are fired by suitable ignition system, in a known manner.

As shown in FIG. 4, the overall height of the engine 24 is reduced by positioning the throttle device 152 below the runners 170, 172. In addition, with the throttle device 152 mounted at a position between the induction runners 170, 172 and the exhaust pipe, the present invention effectively utilizes a large dead space which has gone unused in known outboard motors with V-type engines.

As discussed above, one advantage stemming from positioning the throttle device 152 at least partially below the upper surface of the crankcase 42, and the thus resulting reduction in the overall height of the engine, is that a tight fitting cowling may be fit over the engine which is shorter in overall height than a known conventional cowling. As discussed above, since the upper portion or the powerhead of an outboard motor is subjected to significant airflow during certain operation conditions, it is desirable to shape the upper cowling so as to minimize the frontal area of the cowling. By reducing the frontal area of the cowling the aerodynamic drag on the watercraft using the outboard motor 10 is therefore reduced.

Figure 5:
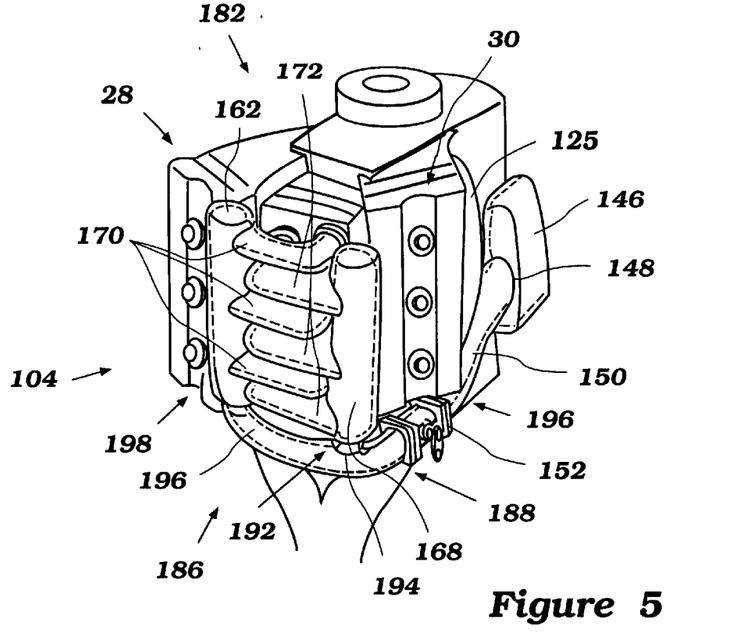
FIG. 5 is a rear, top, and right side perspective view illustrating a variation of the engine shown in FIG. 4.

With reference to FIG. 5, a variation of the embodiment shown in FIG. 4 is shown. The induction system 104 is configured in accordance with the embodiment shown in FIG. 4. In particular, the throttle device 152 is arranged at a position at least partially below the upper surface of the crankcase 42. However, in the arrangement shown in FIG. 5, the throttle device 152 is arranged beneath one of the cylinder banks 28, 30. Additionally, the connection between the throttle device 152 and the plenum chambers 162 and 168 differs.

As shown in FIG. 5, the throttle device 152 is connected to the plenum chambers 162, 168 via an induction passage 150. As shown in FIG. 5, the induction passage 150 includes a branch portion 186 connecting the throttle device 152 with the plenum chambers 162, 168. The branch portion 186 is connected to the throttle device 152 by a flange assembly 188, which may be identical to the flange assembly 154 shown in FIG. 4. The branch portion 186 extends rearward from the throttle device 152 and curves inwardly toward the valley 102 of the engine 24.

Below the second plenum chamber 168, the branch portion 186 defines a junction portion 192. The junction portion 192 divides the branch portion 186 into a first branch passage 194 and a second branch passage 196. The first branch passage 194 connects the induction passage 150 with the second plenum chamber 168. The second branch passage 196 connects the induction passage 150 with the first plenum chamber 162. As shown in FIG. 5, the second branch passage 196 extends generally horizontally between the junction portion 192 and the first plenum chamber 162.

As illustrated in FIG. 5, with the throttle device 152 arranged beneath the cylinder bank 30, the throttle device 152 can be positioned within a portion of the engine compartment 144 which conventionally has been unused (i.e., dead space). Optionally, the camshaft drive mechanism can be arranged at the upper end 182 of the engine 24. Due to the offset arrangement of the cylinders 82 within the cylinder bank 30, the lowermost end 196 of the cylinder bank may be higher than the lowermost end 198 of the cylinder bank 28. Thus, the additional space beneath the cylinder bank 30 generated by the offset arrangement of the cylinders and the resulting higher position of the lower end 196 of the cylinder bank 30 provides an adequate space for positioning the throttle device 152, while lowering the overall height of the engine 24.

Figure 6:
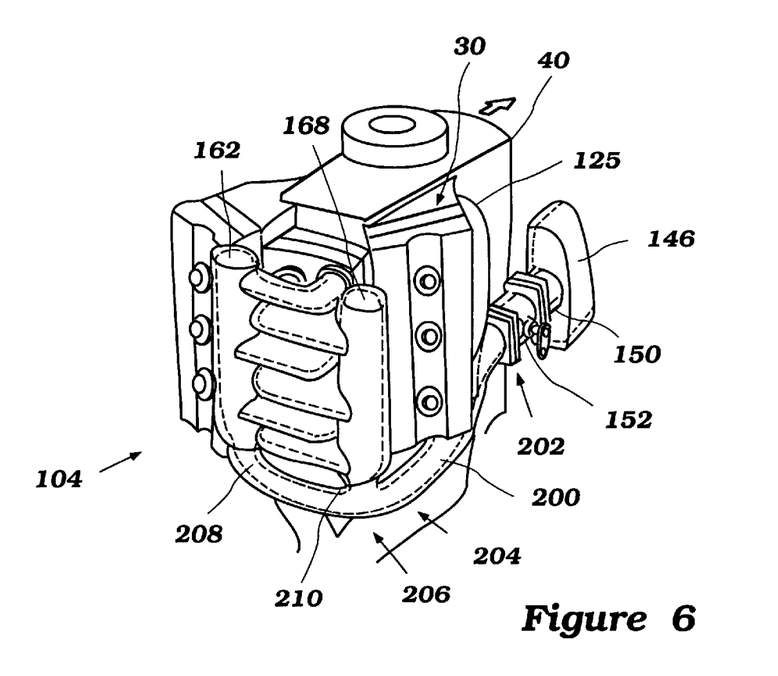
FIG. 6 is a rear, top, and right side perspective view illustrating a further variation of the engine shown in FIG. 4.

With reference to FIG. 6, a further variation of the embodiment of FIG. 4 is shown. The induction system 104, with the exception of the position of the throttle device 152, is arranged identically to the induction system 104 shown in FIG. 5. In the arrangement shown in FIG. 6, however, the throttle device 152 is arranged forward from the cylinder bank 30. More particularly, the throttle device 152 is arranged forward of the exhaust manifold 125 next to the crankcase member 40.

As shown in FIG. 6, the induction passage 150 includes a branch portion 200 connected to the throttle device 152 at a flange assembly 202. The flange assembly 202 may be identical in construction to the flange assembly 156 shown in FIG. 4. As shown in FIG. 6, at a downstream end 204, the branch portion 200 defines a junction portion 206. A first branch passage 208 connects the induction passage 150 with the first plenum chamber 162. Additionally, a second branch passage 210 connects the induction passage 150 with the second plenum chamber 168.

As shown in FIG. 6, with the throttle device 152 arranged on a side of the crankcase 42 and forwardly of the cylinder bank 30 and the exhaust manifold 125, the throttle device 152 can be arranged on a side of the engine so as to not affect the overall height of the engine 24. Thus, the arrangement of the induction system 104 shown in FIG. 6 benefits from the arrangement of dual plenum chambers and extended intake runners while not adding to the overall height of the engine. Additionally, as shown in FIG. 6, the air intake device 146 can be positioned forward from the crankcase member 40. Thus, the intake device 146 communicates with the relatively large supply of cooler air that circulates within the front portion of the engine compartment 144.

Figure 7:
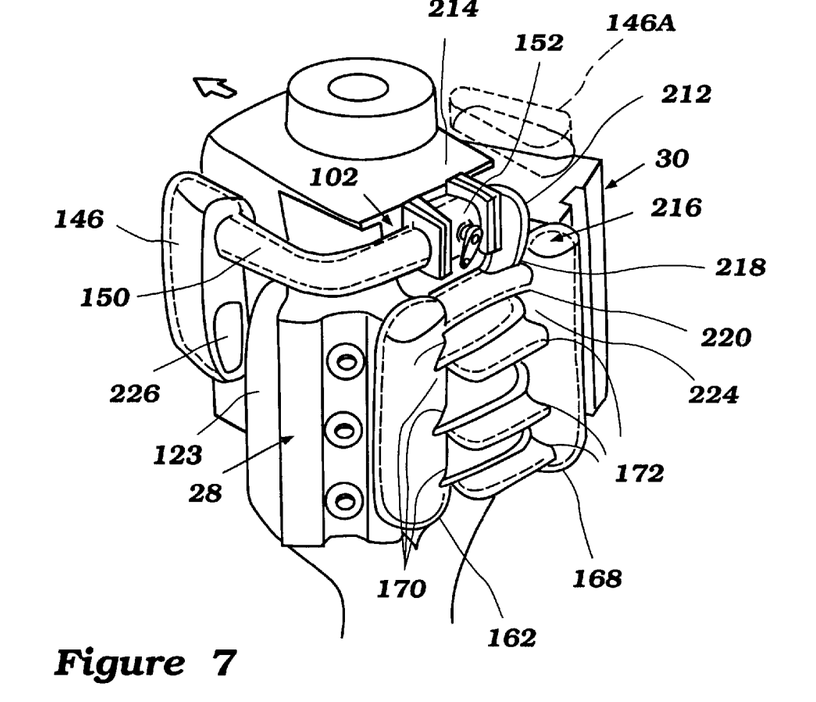
FIG. 7 is a rear, top, and left side perspective view illustrating an additional variation of the engine shown in FIG. 4.

With reference to FIG. 7, another variation of the embodiment shown in FIG. 4 is shown. The throttle device 152 is arranged above the intake runners 170 and 172 and at least partially nested within the valley 102.

As shown in FIG. 7, the induction passage 150 includes a branch portion 212 connected to the throttle device 152 at a flange assembly 214 which may be constructed identically to the flange assembly 156 shown in FIG. 4. The branch portion 212 extends from the downstream end of the throttle device 152 and curves downwardly. Downstream from the throttle device 152, the branch portion 212 defines a junction portion 218.

The junction portion 218 connects the throttle device with a cross member passage 220 which extends laterally between the plenum chambers 162, 168. More particularly, the cross member passage 220 is connected to the plenum chambers 162, 168 at their inner surfaces 222, 224, respectively. As shown in FIG. 7, the cross member passage 220 extends substantially parallel to the intake runners 170, 172 between the inner surfaces 222, 224 of the plenum chambers 162, 168. By positioning the cross member passage as such, the throttle device 152 may be positioned so as to be at least partially nested within the valley portion 102, thereby reducing the overall height of the engine 24.

As shown in FIG. 7, the air inlet device 146 is positioned forward of the cylinder bank 28 and the exhaust manifold 123. Additionally, the inlet device 146 includes an inlet 226 which opens toward the exhaust manifold 123 and is positioned below the induction passage 150. Positioned as such, the inlet 226 is shielded from water dripping from above by the intake passage 150. By being positioned so as to face the exhaust manifold 123, water that may be splashed near the inlet 226 also is quickly evaporated by the exhaust manifold 123 since the exhaust manifold 123 is usually hot during operation of the engine 24. Alternatively, the inlet device 146 may be positioned forward of cylinder bank 30, this position being indicated by the reference numeral 146a in FIG. 7. With the inlet device 146 in the position labeled as 146a, the induction passages 150 and 212 would be arranged in an opposite arrangement shown in FIG. 7 so that the induction passage 150 would extend from the throttle device 152 to the inlet device 146a.

Figure 8:
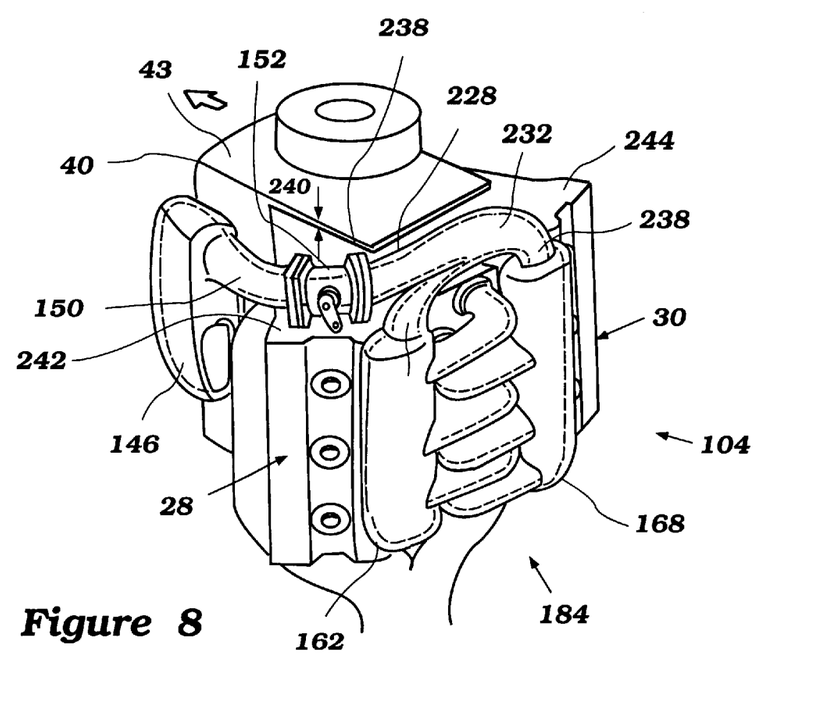
FIG. 8 is a rear, top, and left side perspective view illustrating another variation of the engine shown in FIG. 4.

With reference to FIG. 8, a variation of the embodiment shown in FIG. 4 is illustrated. The throttle device 152 is arranged directly above the cylinder bank 128. The induction passage 150 includes a branch portion 228 connected to the downstream end of the throttle device 152 at a flange assembly 230 which may be identical to the flange assembly 156 shown in FIG. 4. The branch portion 228 connects the throttle device 152 with the plenum chambers 162,168.

As shown in FIG. 8, the branch portion 228 defines a junction portion 232. A first branch passage 236 connects the junction portion 232 with the first plenum chamber 162. A second branch passage 238 connects the junction portion 232 with the second plenum chamber 168. Arranged as such, the first and second branch passages 236 and 238 form a passage that is shaped generally as an inverted U.

With the throttle device 152 arranged directly above the cylinder bank 28, the throttle device 152 is positioned at least partially below the upper surface 43 of the crankcase 42, and thus, the overall height of the engine 24 is reduced. For example, shown in FIG. 8, there is step 240 formed at the connection between the cylinder bank 28 and the crankcase 42. Therefore, by positioning the throttle device 152 directly above the cylinder bank 28, the throttle device 152 can be positioned at an elevation that is lower than the upper surface 43 of the crankcase 42 by at least the magnitude of the step 240.

With the throttle device 152 arranged directly above the cylinder bank 28, the drive for the camshaft drive mechanism can be arranged at the lower end 184 of the engine. With the drive arranged at the lower end 184 of the engine 24, the upper surface 242 of the cylinder bank 28 is at an elevational lower than the upper surface 244 of the cylinder bank 30. The difference in elevation between the upper surface 242 of the right cylinder bank 28 and the upper surface 244 of the left cylinder bank 30 is the result of the staggering of the cylinders 80, 82 with respect to one another which is conventional in V-type engines. Therefore, when the camshaft drive mechanism is located on the lower side 184 of the engine 24, the step 240 can be as large as approximately one-half of a diameter of the cylinders 80, 82. With the throttle device 152 positioned directly above the cylinder bank 28, the throttle device 152 can be arranged at an elevation lower than that which would result from positioning the throttle device 152 directly above the upper surface 43 of the crankcase 42.

Figure 9:
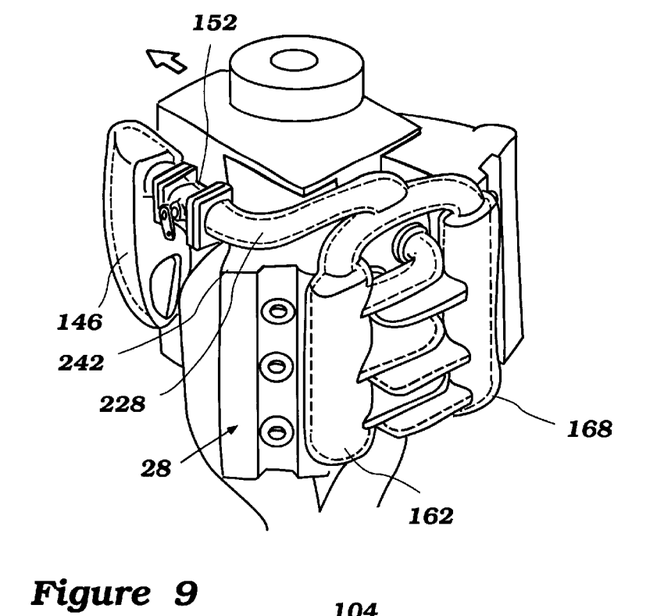
FIG. 9 is a rear, top, and left side perspective view illustrating a further variation of a modification of the engine shown in FIG. 4.

With reference to FIG. 9, a further variation of the embodiment shown in FIG. 4 is illustrated. The throttle device 152 is arranged rearward from the cylinder bank 28. The throttle device is connected to the plenum chambers 162 and 168 via a branch portion 228, in a manner which is similar to that shown in FIG. 8. However, by positioning the throttle device 152 rearward of the cylinder bank 28 and next to the crankcase 42, the overall height of the engine 24 is further reduced as compared to the arrangement shown in FIG. 8. In particular, since the throttle device 152 is not arranged directly above the cylinder bank 28, the induction passage 228 can be arranged closer to the upper surface 242 of the cylinder bank 28. Thus, the overall height of the engine 24 is further reduced.

Figure 10:
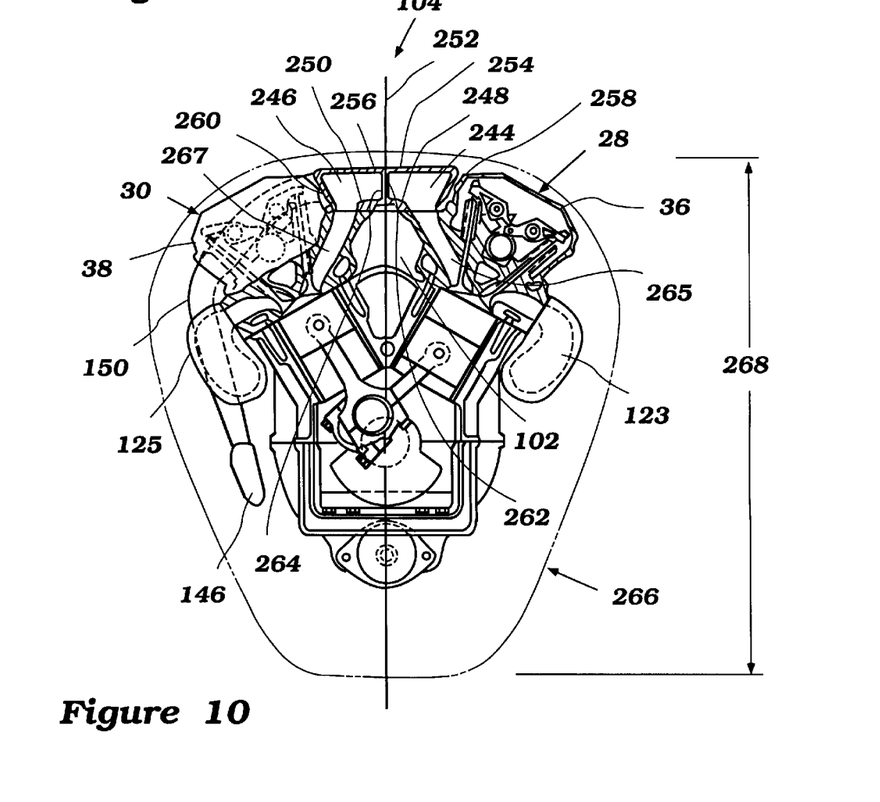
FIG. 10 is a top plan and partial cross-sectional view illustrating a variation of the induction system shown in FIG. 4.

With reference to FIG. 10, a variation of the plenum chambers and intake runners of the embodiment of FIG. 2 is shown therein. As shown in FIG. 10, the induction system 104 includes a pair of vertically extending plenum chambers 244, 246.

The plenum chambers 244, 246 extend over substantially the entire length of the cylinder banks 28, 30. As shown in FIG. 10, the plenum chambers 244, 246 have a cross-sectional shape, taken along a plane perpendicular to their longitudinal axes, that is generally trapezoidal in shape. More particularly, the plenum chambers 244, 246 have inner walls 248, 250, respectively, which lie generally vertically and perpendicular to an axis 252 which bisects the valley portion 102. Additionally, the plenum chambers 244, 246 include outer walls 254, 256 respectively, which are also generally perpendicular to the axis 252. The plenum chambers 244, 246 also include outer lateral walls 258, 260 respectively and inner lateral walls 262, 264. In the illustrated embodiment, the inner lateral walls 262, 264 are integrally formed as a common wall between the plenum chambers 244, 246.

As shown in FIG. 10, the inner lateral walls 262, 264 are generally parallel to the axis 252 while the outer lateral walls 258, 260 taper generally outward from the axis 252, so as to flare laterally outward from the axis 252 towards a rearward direction of the engine 24. As such, the outer lateral walls 258, 260 generally compliment the V-shaped contour of the valley portion 102. Thus, the plenum chambers 244, 246 efficiently utilize the space formed within the valley portion 102 for receiving the plenum chambers 244 and 246.

With the inner lateral walls 262 and 264 arranged either adjacent to each other or as a common wall, intake runners 265 and 267 desirably extend to the combustion chambers which lie on the same side of the axis 252 as their respective plenum chambers 244 and 246. As such, the plenum chambers 244, 246 and intake runners 265, 267 can be more tightly packed within the valley portion 102. Thus, the volume of the plenum chambers 244 and 246 is large and tightly arranged within the valley portion 102.

For example, as shown in FIG. 10, the plenum chambers 244, 246 form a compact unit within the valley 102 such that the plenum chambers 244, 246 fit generally between the valve covers 36, 38. As such, the outer walls 254, 256 of the plenum chamber 244, 246 lie approximately flush with the outer surfaces of the valve covers 36, 38. Thus, the outer periphery of the engine 24 along the valve covers 36, 38 and the plenum chambers 244, 246 is generally smooth, in top plan view as shown in FIG. 10. Additionally, by constructing the plenum chambers 244 and 246 as such, an upper cowling 266 may be fitted tightly around the engine 24. More particularly, the upper cowling 266 is wedge shaped and is sized so as to fit closely with the outer periphery defined by the valve covers 36, 38 and the plenum chambers 244 and 246. Thus, an overall depth 268 of the cowling 266 can be reduced.

Additionally, by including the arrangement of the throttle device 152, inlet device 146, and a branch portion, in accordance with any of the variations shown in FIGS. 4–9, the overall height of the engine 24, and thus the overall height of the cowling member 266 can be reduced.

Although this invention has been described in terms of a certain preferred embodiment and variations thereof, other embodiments and variations apparent to those of ordinary skill in the art are also within the scope of this invention. Accordingly, the scope of the invention is intended to be defined only by the claims that follow.

What is claimed is:

1. An outboard motor comprising a powerhead including a four-stroke V-type internal combustion engine and a cowling covering the internal combustion engine, the engine having an output shaft and being mounted in the powerhead so that the output shaft rotates about a generally vertically extending axis, the engine including a crankcase having an upper surface and first and second cylinder banks connected to the crankcase, each cylinder bank including at least one cylinder having a longitudinal axis and defining at least in part a combustion chamber, the cylinder banks forming a valley therebetween, the engine having an induction system comprising an air inlet, an induction passage extending from the air inlet and configured to guide air into the engine for combustion purposes, a throttle device provided in the induction passage, the throttle device being positioned at least partially below an upper end of the engine, a pair of vertically extending plenum chambers communicating with the combustion chambers in the cylinder banks and with the induction passage, and a plurality of intake runners extending from each of the plenum chambers to intake passages that communicate with respective combustion chambers formed in the cylinder banks, and at least a portion of each runner and at least a portion of each plenum chamber being disposed within the valley.

2. An outboard motor as the forth in claim 1 additionally comprising a plurality of intake runners extending from each of the plenum chambers to intake passages that communicate with respective combustion chambers formed in the cylinder banks, and the throttle device being positioned below the plurality of intake runners.

3. An outboard motor as set forth in claim 2, wherein each runner extends across at least a portion of the valley.

4. An outboard motor as set forth in claim 2, wherein each plenum chamber communicates with intake passages of the cylinder bank adjacent to the respective plenum chamber.

5. An outboard motor as set forth in claim 1, wherein each plenum chamber has an elongated shape extending along a generally vertically oriented axis, and the throttle device is disposed generally between the axes of the plenum chambers.

6. An outboard motor as set forth in claim 1, additionally comprising a cylinder head assembly attached to each cylinder bank, and wherein at least a portion of each plenum chamber extends along and next a portion of one of the cylinder head assemblies.

7. An outboard motor as set forth in claim 6, wherein the plenum chambers lie entirely within the valley defined between the cylinder banks and the cylinder head assemblies.

8. An outboard motor as set forth in claim 6, wherein each cylinder head assembly includes a cylinder head cover, and each plenum chamber extends over a portion the respective cylinder head cover outside the valley.

9. An outboard motor as set forth in claim 1 additionally comprising a cylinder head assembly provided on each cylinder bank, and the induction passage extending around one of the cylinder head assemblies.

10. An outboard motor as set forth in claim 1, wherein the throttle device is positioned to a side of one of the cylinder banks opposite the valley.

11. An outboard motor as set forth in claim 1, wherein the throttle device is disposed on a side of the engine generally opposite of the valley between the cylinder banks.

12. An outboard motor as set forth in claim 11, additionally comprising an exhaust manifold communicating with at least one of the combustion chambers, and wherein the throttle device is positioned forward of the exhaust manifold.

13. An outboard motor as set forth in claim 12, wherein the inlet is positioned forward of the crankcase.

14. An outboard motor as set forth in claim 1, wherein the throttle device is positioned adjacent an upper end of one of the cylinder banks.

15. An outboard motor as in claim 14, wherein the induction passage includes a branch portion that communicates with the a plurality of plenum chamber and is disposed generally within the valley between the cylinder banks.

16. An outboard motor as set forth in claim 1 additionally comprising a drive for a valve mechanism arranged at a lower end of the cylinder banks, and wherein the throttle device is positioned on an upper end of the first cylinder bank.

17. An outboard motor as set forth in claim 16, wherein the respective cylinders formed in the cylinder banks are staggered with respect to one another, the upper end of the first cylinder bank being at an elevation lower than an upper end of the second cylinder bank.

18. An outboard motor as set forth in claim 1 additionally comprising a branch formed in the induction passage which defines first and second branch portions connecting the induction passage to respective plenum chambers, the branch portion being formed downstream of the throttle device.

19. An outboard motor as set forth in claim 1, wherein the air intake is disposed next to the crankcase.

20. An outboard motor as set forth in claim 1, wherein the throttle device is positioned beneath a lower end of one of the cylinder banks.

21. An outboard motor as set forth in claim 1, wherein the throttle device is disposed adjacent to the crankcase.

22. An outboard motor as set forth in claim 21, wherein at least a portion of the induction passage extends beneath a lower end of one of the cylinder banks.

23. An outboard motor as set forth in claim 22, wherein at least a portion of the induction passage extends above an upper end of one of the cylinder banks.

24. An outboard motor comprising a powerhead including a four-stroke V-type internal combustion engine and a cowling covering the internal combustion engine, the engine having an output shaft and being mounted in the powerhead so that the output shaft rotates about a generally vertically extending axis, the engine including a crankcase having an upper surface and first and second cylinder banks connected to the crankcase, each cylinder bank including at least one cylinder having a longitudinal axis and defining at least in part a combustion chamber, the cylinder banks forming a valley therebetween, the engine having an induction system comprising an air inlet, an induction passage extending from the air inlet and configured to guide air into the engine for combustion purposes, a throttle device provided in the induction passage, the throttle device being positioned at least partially below an upper end of the engine, a pair of vertically extending plenum chambers communicating with the combustion chambers in the cylinder banks and with the induction passage, a plurality of intake runners extending from each of the plenum chambers to intake passages that communicate with respective combustion chambers formed in the cylinder banks, and the throttle device being positioned below the plurality of intake runners the outboard motor additionally comprising at least one exhaust pipe communicating with at least one of the combustion chambers and with an exhaust discharge, the throttle device being positioned between the intake runners and the exhaust pipe.

25. An outboard motor comprising a powerhead including a four-stroke V-type internal combustion engine and a cowling covering the internal combustion engine, the engine having an output shaft and being mounted in the powerhead so that the output shaft rotates about a generally vertically extending axis, the engine including a crankcase having an upper surface and first and second cylinder banks connected to the crankcase, each cylinder bank including at least one cylinder having a longitudinal axis and defining at least in part a combustion chamber, the cylinder banks forming a valley therebetween, the engine having an induction system comprising an air inlet, an induction passage extending from the air inlet and configured to guide air into the engine for combustion purposes, a throttle device provided in the induction passage, the throttle device being positioned at least partially below an upper end of the engine, and a pair of vertically extending plenum chambers communicating with the combustion chambers in the cylinder banks and with the induction passage the outboard motor additionally comprising an exhaust system including at least one exhaust pipe communicating with at least one of the combustion chambers and with an exhaust discharge, the throttle device being positioned above at least a portion of the exhaust pipe.

26. An outboard motor as set forth in claim 25, wherein the exhaust system includes a second exhaust pipe communicating with at least another of the combustion chamber and with the exhaust discharge, the exhaust pipes merging at a merge point, and the throttle device is disposed above the merge point.

27. An outboard motor comprising a powerhead including a four-stroke V-type internal combustion engine and a cowling covering the internal combustion engine, the engine having an output shaft and being mounted in the powerhead so that the output shaft rotates about a generally vertically extending axis, the engine including a crankcase having an upper surface and first and second cylinder banks connected to the crankcase, each cylinder bank including at least one cylinder having a longitudinal axis and defining at least in part a combustion chamber, the cylinder banks forming a valley therebetween, the engine having an induction system comprising an air inlet, an induction passage extending from the air inlet and configured to guide air into the engine for combustion purposes, and a throttle device provided in the induction passage, the throttle device being positioned at least partially below an upper end of the engine and at least partially disposed in the valley.

28. An outboard motor as set forth in claim 27, additionally comprising a plurality of intake runners extending from each of the plenum chambers to intake passages that communicate with respective combustion chambers formed in the cylinder banks, and wherein the throttle device is positioned above the intake runners.

29. An outboard motor as set forth in claim 28, wherein the induction passage includes a branch portion located below the throttle device generally within the valley.

* * * * *

UNITED STATES PATENT AND TRADEMARK OFFICE
CERTIFICATE OF CORRECTION

PATENT NO.    : 6,298,815 B1
DATED         : October 9, 2001
INVENTOR(S)   : Yukinori Kashima, Akihiro Onoue, Masanori Takahashi and Yoshibumi Iwata It is certified that error appears in the above-identified patent and that said Letters Patent is hereby corrected as shown below:

<u>Title page,</u>
Item [30], Foreign Application Priority Data, please change "Dec. 22, 1999" to -- Dec. 22, 1998 --.

Signed and Sealed this

Seventh Day of May 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO. : 6,298,815 B1　　　　　　　　　　　　　　　　　　　　　Page 1 of 1
DATED : October 9, 2001
INVENTOR(S) : Yukinori Kashima et al.

It is certified that error appears in the above-identified patent and that said Letters Patent is hereby corrected as shown below:

<u>Column 14,</u>
Line 8, please delete "a".
Line 8, please change "chamber" to -- chambers --.

Signed and Sealed this

Twenty-third Day of December, 2003

JAMES E. ROGAN
*Director of the United States Patent and Trademark Office*